United States Patent [19]

Vasta

[11] 3,993,843
[45] Nov. 23, 1976

[54] AQUEOUS DISPERSION OF AROMATIC POLYSULFONE RESIN WITH PERFLUOROCARBON RESIN, AND COATED ARTICLES

[75] Inventor: Joseph A. Vasta, Woodbury, N.J.

[73] Assignee: E. I. Du Pont de Nemours and Company, Wilmington, Del.

[22] Filed: Apr. 1, 1975

[21] Appl. No.: 564,215

Related U.S. Application Data

[63] Continuation of Ser. No. 340,844, March 13, 1973, abandoned.

[52] U.S. Cl. .......................... 428/422; 260/29.2 R; 260/29.6 F; 260/900; 428/463
[51] Int. Cl.² .................. C08L 27/18; C08L 81/06
[58] Field of Search ................ 260/29.6 F, 900; 428/422

[56] References Cited
UNITED STATES PATENTS

| | | | |
|---|---|---|---|
| 3,321,449 | 5/1967 | Vogel | 260/79.3 M |
| 3,355,272 | 11/1967 | D'Alessandro | 260/837 R |
| 3,423,479 | 1/1969 | Hendricks | 260/824 |
| 3,453,208 | 7/1969 | Gallagher et al. | 260/900 |
| 3,728,313 | 4/1973 | Hill et al. | 260/79 |
| 3,792,113 | 2/1974 | Goswami et al. | 260/900 |

Primary Examiner—Murray Tillman
Assistant Examiner—A. H. Koeckert

[57] ABSTRACT

The novel aqueous coating composition contains a uniformly dispersed aromatic polysulfone resin and is useful as a protective coating composition for wood, metal, wire, glass and plastics and can be used as an adhesive; finishes of the novel composition have excellent stain resistance, good thermal stability, scratch, mar and impact resistance and good release properties and are useful as appliance finishes, industrial equipment finishes, finishes for bakeware and cookware.

7 Claims, No Drawings

AQUEOUS DISPERSION OF AROMATIC POLYSULFONE RESIN WITH PERFLUOROCARBON RESIN, AND COATED ARTICLES

CROSS-REFERENCE TO RELATED APPLICATIONS

This application is a continuation of Ser. No. 340,844, filed Mar. 13, 1973 now abandoned.

BACKGROUND OF THE INVENTION

This invention relates to aqueous coating compositions and in particular to an aqueous dispersion of a polysulfone resin.

Industry requires finishes that are tough, durable and scratch resistant and are thermally stable for equipment subjected to heat such as household and industrial ovens. Bakeware and cookware require finishes that have food release properties and thermal stability. Also, the exterior areas of cookware such as fry pans, covers for fry pans, the sides and bottoms of electric cooking appliances require finishes that are tough, durable and thermally stable. Coating compositions that form these finishes should be non-airpolluting and preferably, therefore should be aqueous solutions or dispersions.

Finishes of polysulfone resins meet the requirements of toughness, durability, scratch resistance and thermal stability. These resins are well known in the art as shown by Vogel U.S. Pat. No. 3,321,449, issued May 23, 1967; British Pat. No. 1,122,192, published July 31, 1968; D'Alessandro U.S. Pat. No. 3,355,272, issued Nov. 28, 1967; Cohen et al. U.S. Pat. No. 3,518,235, issued June 30, 1970; Pietrusza et al. U.S. Pat. No. 3,536,665, issued Oct. 27, 1970. However, it has not been possible to formulate these resins into aqueous coating compositions.

The novel process of this invention prepares a non-airpolluting aqueous dispersion of aromatic polysulfone resins and these novel aqueous polysulfone dispersions form finishes that have excellent adhesion to all types of substrates and are tough, durable, scratch resistant and thermally stable and have excellent release properties.

SUMMARY OF THE INVENTION

The aqueous coating composition of this invention comprises a dispersion of 10–60% by weight of a film-forming binder dispersed in 37–89.9% by weight of water; wherein the dispersed binder particles have a particle size of about 0.02–0.5 microns and are dispersed by about 0.1–3.0% by weight of a surfactant and the binder comprises an aromatic polysulfone resin of the formula

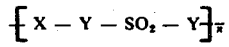

or

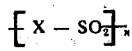

where X and Y are divalent aromatic radicals having 6 to 32 carbon atoms and $n$ is a positive integer of 5 to 150.

The process for preparing the aqueous dispersion of the aromatic polysulfone resin also is part of this invention.

DESCRIPTION OF THE INVENTION

The aqueous dispersion of this invention preferably contains about 20–55% by weight of the film-forming binder. The dispersion can contain pigments which are uniformly dispersed therein in a pigment to binder weight ratio of about 1:100 to about 200:100.

The polysulfone resin used in the novel dispersion of this invention has repeating units of the formula

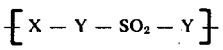

or

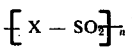

where X and Y are divalent aromatic radicals that have 6 to 32 carbon atoms and $n$ is a positive integer of 5 to 150.

In the preferred polysulfone resins used in this invention, X and Y can be one of the following devalent aromatic radicals:

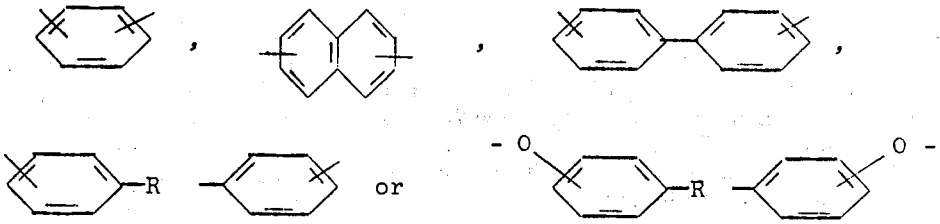

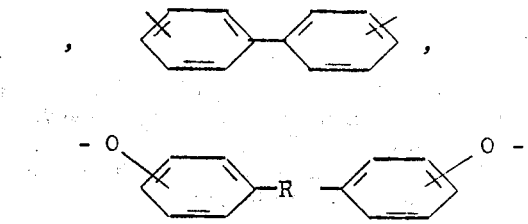

R is either an alkylene radical having 1–6 carbon atoms, —O—,

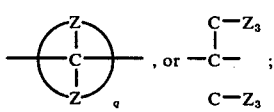

where $q$ is a positive integer of 1–6 and Z is one of the following halogens: fluorine, chlorine or bromine. The above phenylene, naphthalene, and biphenylene radicals may have one of the above halogens substituted for one or more of the hydrogen atoms.

The polysulfone resins used in the novel composition of this invention are prepared by any of the techniques well known in the art. The following patents illustrate methods for preparing these polysulfone resins: Robinson et al. U.S. Pat. Nos. 3,264,536, issued Aug. 2, 1966; Vogel, 3,321,449, issued May 23, 1967; D'Alessandro, 3,355,272, issued Nov. 28, 1967; British Pat. No. 1,122,192, published July 31, 1968. The following articles also show the preparation of these polysulfone resins and are incorporated herein by reference:

Johnson et al. "Poly(Aryl Ethers) by Nucleophilic Aromatic Substitution. I. Synthesis and Properties" J. of Polymer Science, Part A-1, 5, (9) 2375–98 (1967).

Jennings et al. "Synthesis of Poly(Arylene Sulfones) and Poly(Arylene Ketones) by Reactions Involving Substitution of Aromatic Nuclei" J. of Polymer Science, Part C No. 16 (Part 2) 715-24 (1967).

Hale et al. "Thermal Stability of Polyaryl Ethers Prepared by Aromatic Nucleophilic Substitution." Amer. Chem. Soc., Div. of Polymer Chem. Reprints 7 (2) 503-12.

One particularly useful polysulfone resin used in the novel composition of this invention is of the formula:

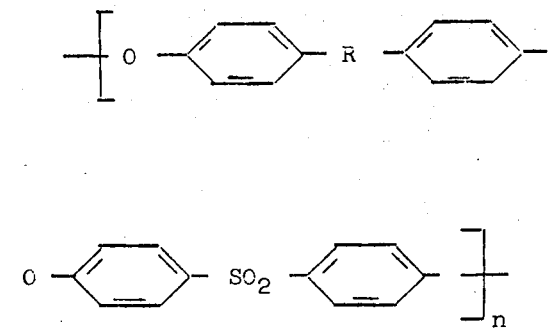

where R is an alkylene group of 1-6 carbon atoms and n is from 50-120. In one preferred polysulfone resin of the type that forms a high quality composition, R is

and n is from 50-80. This preferred resin can be prepared according to Example 1 of the above D'Alessandro U.S. Pat. No. 3,355,272.

Another particularly useful polysulfone resin used in this invention is of the formula:

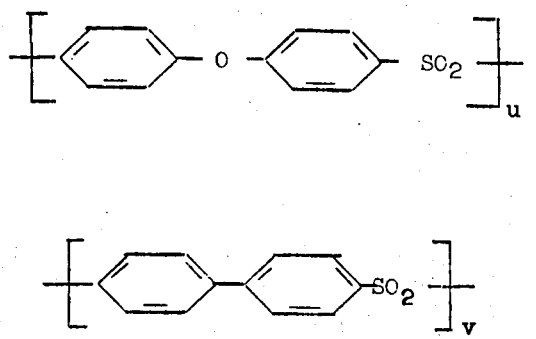

where $u$ is 50 to 120 and $v$ is 50 to 120. This resin can be prepared according to the teachings of the above British patent.

About 0.1-3.0% by weight of a surfactant is added to the novel dispersion to keep the binder particles uniformly dispersed. Either anionic or nonionic surfactants can be used. Typically useful nonionic surfactants are alkyl phenoxypolyethoxyethanols having 7-12 carbon atoms in the alkyl group such as heptylphenoxypolyethoxyethanols, octylphenoxypolyethoxyethanols, methyl octylphenoxypolyethoxyethanols and the like; polyethoxyethanol derivatives of methylene linked alkyl phenols; sulfur containing agents, such as those made by condensing ethylene oxide with nonyl, dodecyl, tetradecyl mercaptans or with alkyl thiophenols having alkyl groups of six or 15 carbon atoms; ethylene oxide derivatives of long chained carboxylic acids, such as lauric, myristic, palmitic, oleic and the like or mixtures thereof as found in tall oil; ethylene oxide condensates of long chained alcohols, such as octyl, decyl, lauryl or cetyl alcohols, ethylene oxide derivatives of etherified or esterified polyhydroxy compounds having a hydrophobic hydrocarbon chain. One preferred nonionic surfactant is isoctyl phenoxypolyethoxyethanol.

Typical anionic surfactants that can be used are sodium lauryl sulfate, sodium polynaphthalene sulfonate, soluble alkali metal and ammonium salts of half esters of sulfuric acid with long chain fatty alcohols, alkyl aryl sulfonates, alkyl aryl polyether sulfate, sulfated and sulfonated esters and ethers and alkyl sulfonates.

Other useful nonionic and anionic surfactants are listed in "Synthetic Detergents" by J. W. McCutcheon published annually by MacNair-Dorland Company, New York, N.Y.

A coalescing agent can be added to the novel polysulfone dispersion to form a smooth and glossy film. Preferably, phthalate esters are used in amounts of 5-50% by weight based on the weight of the polysulfone resin. Typical phthalate esters are alkyl aryl phthalates such as butyl benzyl phthalate; dialkyl phthalates such as dimethyl phthalate, dibutyl phthalate, dioctyl phthalate, dihexyl phthalate and cycloaliphatic phthalates such as dicyclohexyl phthalate.

Other water dispersible resins can be blended with the novel polysulfone resin dispersion to form high quality coating compositions such as silicone resins, polystyrene, acrylic resins, polyesters, perfluorocarbon resins, polyvinyl chloride and polyvinylidine chloride. Other compounds such as lithium polysilicate can be dispersed with the polysulfone resin. Also, zinc dust or flake can be dispersed in the polysulfone resin dispersion to form a corrosion resistant finish.

One useful aqueous composition of this type comprises a blend of 75-99.8% by weight of the aromatic polysulfone resin and 0.2-25% of a silicone resin.

The silicone resin used has the formula

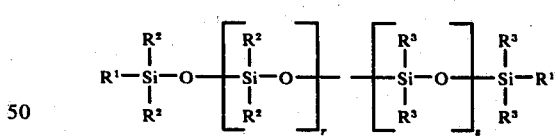

where $R^2$ and $R^3$ are monovalent radicals of hydrogen, an alkyl group having 1-8 carbon atoms such as methyl, ethyl, propyl, isopropyl, butyl, isobutyl, pentyl, hexyl, 2-ethylhexyl or octyl or an aryl group such as phenyl, biphenyl, tolyl, xylyl, naphthyl; $R^1$ is any of the above monovalent radicals including a hydroxyl radical; $r$ and $s$ are positive integers from 0-3000 and are sufficiently large to provide a film-forming resin. Preferably, r and s are from about 20-400. Typical silicone resins are a blend of dimethyl polysiloxane and diphenyl polysiloxane, dimethyl polysiloxane, dimethyl diphenyl polysiloxane, hydroxy terminated dimethyl diphenyl siloxane and the like. Dimethyl diphenyl polysiloxane is a preferred resin since it forms a high quality finish with excellent release properties for cookware and bakeware.

Other preferred aqueous dispersions of this invention comprise 75–98% by weight of the aromatic polysulfone resin and 2–25% by weight of another resin such as polystyrene, an acrylic resin, a polyester resin such as the polyester of terephthalic acid/isophthalic acid-/ethylene glycol, a perfluorocarbon resin such as polytetrafluoroethylene, copolymer of tetrafluoroethylene and hexafluoropropylene or polyvinylidene fluoride or a perchlorocarbon resin, such as polyvinyl chloride, polyvinylidene chloride and the like.

Aqueous dispersion of the polysulfone resin and the perfluorocarbon resins of polytetrafluoroethylene or the copolymer of tetrafluoroethylene and hexafluoropropylene form high quality release finishes for vessels, in particular cookware and bakeware. One preferred copolymer has a tetrafluoroethylene to hexafluoropropylene weight ratio of about 95/5 to about 50/50, and more preferably, the copolymer has a weight ratio of about 75/25 to about 85/15 of tetrafluoroethylene to hexafluoropropylene.

The aqueous dispersed containing perfluorocarbon polymers have a particle diameter of about 0.01 to about 6 microns of the perfluorocarbon polymer particles. Preferably, the dispersions have particles in the range of 0.01–2.0 microns which form dispersions with excellent stability.

The novel aqueous dispersion of this invention can be pigmented in the aforementioned pigment to binder ratio. The pigments can be blended with the novel dispersion composition and then ground by conventional techniques, such as sand milling, pebble milling or ball milling to uniformly disperse the pigment in the composition. Preferably, the pigment is formed into a mill base by grinding the pigment in either a dispersion of the polysulfone resin or a dispersion of another resin if one is used or a solution of one or both of any of the above resins. The mill base is then blended with the coating composition.

The following are examples of the great variety of pigments which can be used in the coating composition of this invention: metallic oxides, preferably titanium dioxide, zinc oxide, and the like, metal hydroxides, metal flakes, such as aluminum flake, metal powders, zinc powders, sulfides, sulfate, carbonates, carbon black, silica, silicates, hydrophobic silicates, such as silicone treated with silicone dioxide, talc, china clay, iron oxide, iron blues, organic reds, maroons and other organic dyes and lakes. For high temperature use, temperature resistant pigment, such as carbon black or red iron oxide are used.

The novel dispersion of this invention can be applied to a variety of substrates, for example, metal, glass or plastics by any of the usual application methods, such as spraying, electrostatic spraying, dipping, brushing, flow coating, roller coating, reverse roller coating and the like. These coatings are baked at about 150°–300° C. for about 5 minutes to 2 hours. The resulting coating is about 0.1–10 mils thick and preferably, 0.5–5 mils thick.

The novel dispersion has excellent adhesion to bare or treated metals such as aluminum or steel or to metals which have been previously primed or painted with alkyd, epoxy or acrylic enamels. Also, the dispersion can be a highly pigmented coating or can be used as a clear coating.

Finishes of the novel dispersion have particularly excellent physical properties as stated above including excellent adhesion to primed and unprimed metal substrates, toughness, hardness, crack and mar resistance. The dispersion is useful for coating vessels such as a finish for the interior or exterior of bakeware or cookware, and can be used as a coating in range parts, plumbing fixtures such as sinks, and as a clear coating for hardware items, such as saws, chisels, planes, knives and the like. Also, the novel dispersion can be utilized as a primary finish for refrigerators, stoves, washers, dryers and the like.

The novel dispersion can also be used as an adhesive for metals, glass and plastics and can be used to form laminates.

Another aspect of this invention is the process for preparing an aqueous dispersion from an aromatic polysulfone resin which has not been possible with prior art processes. The polysulfone resin is dissolved in a water miscible solvent such as tetrahydrofuran, cyclohexanone, dimethyl formamide, dimethyl acetamide to form a solution having a polymer solids content of about 10–30% by weight. This solution then is diluted with a water immiscible solvent that is compatible with the above water miscible solvent to a 2–9% polymer solids content. Typical water immiscible solvents that can be used are toluene, xylene and trichloroethylene.

The above solution is then added under high shear mixing conditions to a solution of 95–99% by weight water and 1–5% by weight of a nonionic or anionic surfactant to form an emulsion. Preferably, a shear rate of 2,000–10,000 reciprocal seconds is used for about 1 to 10 minutes to form the emulsion.

Residual solvent is removed from the emulsion by subjecting the emulsion to a vacuum of 0.1 to 10 millimeters inches of mercury while the emulsion is under constant agitation to form a dispersion having a solids content of about 10–60% by weight and preferably 20–55% by weight.

The following Examples illustrate the invention. The parts and percentages are by weight unless otherwise specified.

EXAMPLE 1

A polysulfone solution is prepared by blending together the following ingredients:

| | Parts By Weight |
|---|---|
| Polysulfone resin having the formula $\left[ -O-\underset{}{\bigcirc}-\underset{CH_3}{\overset{CH_3}{\underset{|}{\overset{|}{C}}}}-\underset{}{\bigcirc}-O-\underset{}{\bigcirc}-SO_2-\underset{}{\bigcirc}- \right]_n$ where n is from 50–80. | 100 |
| Methylene chloride | 900 |
| Total | 1000 |

The above ingredients are charged into a vessel and heated for about 1 hour to form a solution.

An aqueous dispersion is prepared as follows:

|  | Parts By Weight |
|---|---|
| Portion 1 |  |
| Polysulfone solution (prepared above) | 500.0 |
| Acetone | 107.0 |
| Toluene | 107.0 |
| Methylene chloride | 100.0 |
| Portion 2 |  |
| Deionized water | 500.0 |
| "Triton 770" surfactant solution (30% solution of the sodium salt of alkyl aryl polyether sulfate in water and 23% isopropanol) | 5.0 |
| Total | 1319.0 |

Portion 1 is mixed together and then is slowly added to Portion 2 under high shear mixing conditions using a Waring blender to form an emulsion. The resulting emulsion is then maintained at about 73°–76° C. and placed under vacuum of about 5 millimeters of mercury and with constant agitation, solvents are removed from the emulsion over a 2½ hour period. The resulting dispersion is of a uniform consistency and has a polymer solids content of about 42%.

The dispersion is reduced to a spray viscosity with water and sprayed onto an aluminum substrate and baked at 230° C. for 30 minutes. The resulting finish is clear, tough, scratch and abrasion resistant, has excellent release properties and good thermal stability.

A coating composition that will provide a high gloss finish then is prepared. The following constituents are blended together to form a coalescing composition:

|  | Parts By Weight |
|---|---|
| Butyl benzyl phthalate | 25 |
| Toluene | 40 |
| Deionized water | 32 |
| Surfactant solution (described above) | 3 |
| Total | 100 |

The coating composition is then prepared by blending 100 parts of the above coalescing composition with 100 parts of the above polysulfone dispersion. The resulting coating composition is reduced to a spray viscosity with water and sprayed onto an aluminum substrate and baked as above. The resulting finish is very smooth and has a high level of gloss and has the same physical characteristics as the finish prepared above.

EXAMPLE 2

A coating composition is prepared as follows:

|  | Parts By Weight |
|---|---|
| Portion 1 |  |
| Polysulfone emulsion (42% solids prepared in Example 1) | 11 |
| FEP fluorocarbon resin dispersion (55% solids of a copolymer of tetrafluoroethylene hexafluoropropylene dispersed with 10% by weight of isooctylphenoxy polyethoxyethanol in water) | 8 |
| Red aqueous pigment dispersion (45% solids of red iron oxide pigment dispersed with 5% by weight of sodium polynaphthalene sulfonate in water) | 6 |
| Portion 2 |  |
| Deionized water | 12 |
| Diethylene glycol monobutyl ether | 10 |
| Total | 47 |

Portion 1 is thoroughly blended together and then Portion 2 is added with mixing. The resulting dispersion is sprayed onto an untreated aluminum substrate and on a phosphatized steel substrate and baked for 15 minutes at 260° C. In each case, the resulting finish has excellent adhesion to the metal substrate, is flexible and water repellent and has good release properties.

The coating composition is sprayed onto an aluminum muffin pan and baked as above. The pan has excellent food release properties under baking conditions and has good thermal stability.

EXAMPLE 3

A coating composition is prepared as follows:

|  | Parts By Weight |
|---|---|
| Polysulfone dispersion (48% polysulfone resin solids of the polysulfone resin described in Example 1) | 75 |
| Polytetrafluoroethylene dispersion (60% polymer solids dispersed in water with 6% isooctylphenoxy polyethoxy ethanol) | 21 |
| Aluminum flake paste (80% solids of treated aluminum flake in mineral spirits) | 15 |
| Total | 111 |

The above ingredients are thoroughly blended together to form a coating composition. The composition is reduced to a spray viscosity with water and sprayed onto a phosphatized steel substrate and baked for 30 minutes at 275° C. The resulting finish has a good appearance, good flexibility and excellent release properties.

The finish is useful for the underside of electric fry pans and other cooking appliances.

EXAMPLE 4

An aqueous black pigment dispersion is prepared as follows:

|  | Parts By Weight |
|---|---|
| Deionized water | 67.0 |
| Sodium polynaphthalene sulfonate | 3.0 |
| Carbon black | 20.0 |
| Aluminum silicate | 10.0 |
| Total | 100.0 |

The above ingredients are added in the order given and ground 35000 cycles in a conventional sand mill while maintaining the temperature of the ingredients at 35°–50° C.

A coating composition then is prepared as follows:

|  | Parts By Weight |
|---|---|
| Black pigment dispersion (prepared above) | 33.33 |
| Polytetrafluoroethylene dispersion (described in Example 3) | 41.67 |
| Polysulfone emulsion (described in Example 3) | 150.00 |
| Total | 225.00 |

The above ingredients are blended together to form a coating composition.

The coating composition is reduced in a 1 to 1 ratio with an emulsion of 25% butyl benzyl phthalate, 25% toluene, 47% water and 3% of "Triton" 770 (described in Example 1), and sprayed onto a phosphatized steel panel and baked for 30 minutes at 275° C. The resulting finish has a good appearance, excellent release properties, and good abrasion resistance and detergent resistance. The coating composition is particularly useful for coating bakeware items such as bread pans, muffin pans, cookie sheets and the like, and also is useful as a lubricating coating on curtain rods, pulleys and the like.

The invention claimed is:

1. An aqueous dispersion comprising 10–60% by weight of a film-forming binder dispersed in 37–89.9% by weight of water, wherein the dispersed binder particles have a particle size of about 0.02–0.5 microns and are dispersed by about 0.1–3% by weight of a surfactant; and the binder consists essentially of
   1. 75–98% by weight, based on the weight of the binder, of a polysulfone resin of the formula

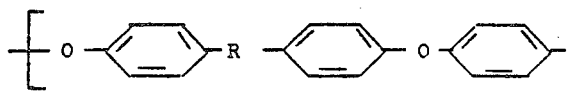

where $n$ is from 50–120 and R is an alkylene group of 1–6 carbon atoms, and
   2. 2–25% by weight, based on the weight of the binder, of a perfluorocarbon resin.

2. The aqueous dispersion of claim 1 in which R is

and the perfluorocarbon resin is polytetrafluoroethylene.

3. The aqueous dispersion of claim 1 in which R is

and the perfluorocarbon resin is a copolymer of tetrafluoroethylene and hexafluoropropylene.

4. A metal substrate coated with a dried coalesced layer of the dispersion of claim 1.

5. The metal substrate of claim 4 in which the metal is aluminum.

6. A vessel coated with a dried coalesced layer of the dispersion of claim 2.

7. The vessel coated with a dried coalesced layer of the dispersion of claim 3.

* * * * *